United States Patent
Anders et al.

(10) Patent No.: US 11,859,510 B2
(45) Date of Patent: Jan. 2, 2024

(54) TURBINE BLADE TIP, TURBINE BLADE AND METHOD

(71) Applicant: Siemens Energy Global GmbH & Co. KG, Bayern (DE)

(72) Inventors: Björn Anders, Berlin (DE); Reiner Anton, Berlin (DE); Kay Krabiell, Hohen Neuendorf (DE); Christian Lerner, Dorsten (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/802,948

(22) PCT Filed: Feb. 8, 2021

(86) PCT No.: PCT/EP2021/052959
§ 371 (c)(1),
(2) Date: Aug. 27, 2022

(87) PCT Pub. No.: WO2021/175538
PCT Pub. Date: Sep. 10, 2021

(65) Prior Publication Data
US 2023/0127843 A1   Apr. 27, 2023

(30) Foreign Application Priority Data
Mar. 6, 2020   (DE) ............... 10 2020 202 891.5

(51) Int. Cl.
*F01D 5/20* (2006.01)
*F01D 5/18* (2006.01)

(52) U.S. Cl.
CPC .............. *F01D 5/18* (2013.01); *F01D 5/186* (2013.01); *F01D 5/187* (2013.01); *F01D 5/20* (2013.01);
(Continued)

(58) Field of Classification Search
CPC ... F01D 5/18; F01D 5/20; F01D 5/186; F01D 5/188; F05D 2240/30; F05D 2260/20
See application file for complete search history.

(56) References Cited

U.S. PATENT DOCUMENTS 5,733,102 A * 3/1998 Lee .................... F01D 5/187
                                                      415/173.1
6,164,914 A * 12/2000 Correia ................ F01D 5/186
                                                      415/173.1
(Continued)

FOREIGN PATENT DOCUMENTS

| DE | 102013109270 A1 | 3/2014 |
| EP | 3428397 A1 | 1/2019 |

OTHER PUBLICATIONS

PCT International Search Report and Written Opinion of International Searching Authority dated May 25, 2021 corresponding to PCT International Application No. PCT/EP2021/052959 filed Feb. 8, 2021.

*Primary Examiner* — J. Todd Newton
*Assistant Examiner* — Theodore C Ribadeneyra
(74) *Attorney, Agent, or Firm* — Wolter Van Dyke Davis, PLLC

(57) ABSTRACT

A turbine blade tip, turbine blade and method where improved cooling is made possible by an improved cooling structure with cooling air holes inside a depression in a blade tip and a special arrangement of multiple cooling air holes which are supplied by a single cooling air channel inside a wall.

20 Claims, 4 Drawing Sheets

(52) U.S. Cl.
CPC ...... *F05D 2220/32* (2013.01); *F05D 2240/30* (2013.01); *F05D 2260/20* (2013.01)

(56) References Cited

U.S. PATENT DOCUMENTS

| | | | |
|---|---|---|---|
| 6,367,687 B1 | 4/2002 | Reeves et al. | |
| 6,602,052 B2* | 8/2003 | Liang | F01D 5/18 416/224 |
| 6,971,851 B2* | 12/2005 | Liang | F01D 5/08 416/97 R |
| 6,991,430 B2* | 1/2006 | Stec | F01D 5/141 415/173.1 |
| 7,704,047 B2* | 4/2010 | Liang | F01D 5/186 416/97 R |
| 7,922,451 B1* | 4/2011 | Liang | F01D 5/187 415/173.5 |
| 7,997,865 B1* | 8/2011 | Liang | F01D 11/00 416/92 |
| 8,043,058 B1* | 10/2011 | Liang | F01D 5/187 415/173.1 |
| 8,066,485 B1* | 11/2011 | Liang | F01D 5/20 416/93 R |
| 8,182,221 B1* | 5/2012 | Liang | F01D 5/087 415/173.5 |
| 8,366,394 B1* | 2/2013 | Liang | F01D 5/187 415/115 |
| 9,097,126 B2 | 8/2015 | Prue et al. | |
| 10,190,418 B2* | 1/2019 | Kwon | F01D 5/20 |
| 10,570,750 B2 | 2/2020 | Rathay et al. | |
| 10,655,473 B2* | 5/2020 | Quach | F01D 5/186 |
| 10,753,207 B2* | 8/2020 | Rathay | F01D 5/186 |
| 10,830,057 B2* | 11/2020 | Beyer | F01D 5/20 |
| 11,015,453 B2* | 5/2021 | Smith | F04D 29/324 |
| 11,136,892 B2* | 10/2021 | Gill | F01D 5/187 |
| 11,512,598 B2* | 11/2022 | Rathay | F01D 5/187 |
| 11,572,792 B2* | 2/2023 | Brandl | F01D 5/20 |
| 2014/0072448 A1* | 3/2014 | Prue | F01D 5/20 29/889.71 |
| 2014/0311164 A1* | 10/2014 | Kwon | F01D 5/20 416/225 |
| 2016/0265366 A1 | 9/2016 | Snyder et al. | |
| 2018/0347375 A1* | 12/2018 | Beyer | F01D 5/187 |
| 2019/0017389 A1* | 1/2019 | Rathay | F01D 5/20 |
| 2019/0153873 A1 | 5/2019 | Smith et al. | |
| 2019/0170000 A1 | 6/2019 | Rathay et al. | |

* cited by examiner

TURBINE BLADE TIP, TURBINE BLADE AND METHOD

CROSS REFERENCE TO RELATED APPLICATIONS

This application is the US National Stage of International Application No. PCT/EP2021/052959 filed 8 Feb. 2021, and claims the benefit thereof. The International Application claims the benefit of German Application No. DE 10 2020 202 891.5 filed 6 Mar. 2020. All of the applications are incorporated by reference herein in their entirety.

FIELD OF INVENTION

The invention relates to an improved design of a turbine blade tip of a turbine blade, and to production methods therefor.

BACKGROUND OF INVENTION

Turbine blades of gas turbines or turbines that are subjected to a high temperature load have internal cooling structures, and possibly cooling holes on the outer wall of the blade, from which cooling air flows out from the interior of the turbine blade.

These blade tips often have a circumferential wall at their radial end, which extends along the outer contour of the blade and thus forms a recess in-between.

SUMMARY OF INVENTION

It is an object of the invention to improve the cooling of such a turbine blade tip.

The object is achieved by a blade tip, a turbine blade and a method according to the independent claims.

Listed in the subclaims are further advantageous measures that may be combined with each other in any manner in order to achieve further advantages.

BRIEF DESCRIPTION OF THE DRAWINGS

The invention is shown schematically in FIGS. 1 to 6.

DETAILED DESCRIPTION OF INVENTION

The description and the figures present only exemplary embodiments of the invention, which may also be combined with each other in any manner in order to achieve further advantages.

Figure 1:
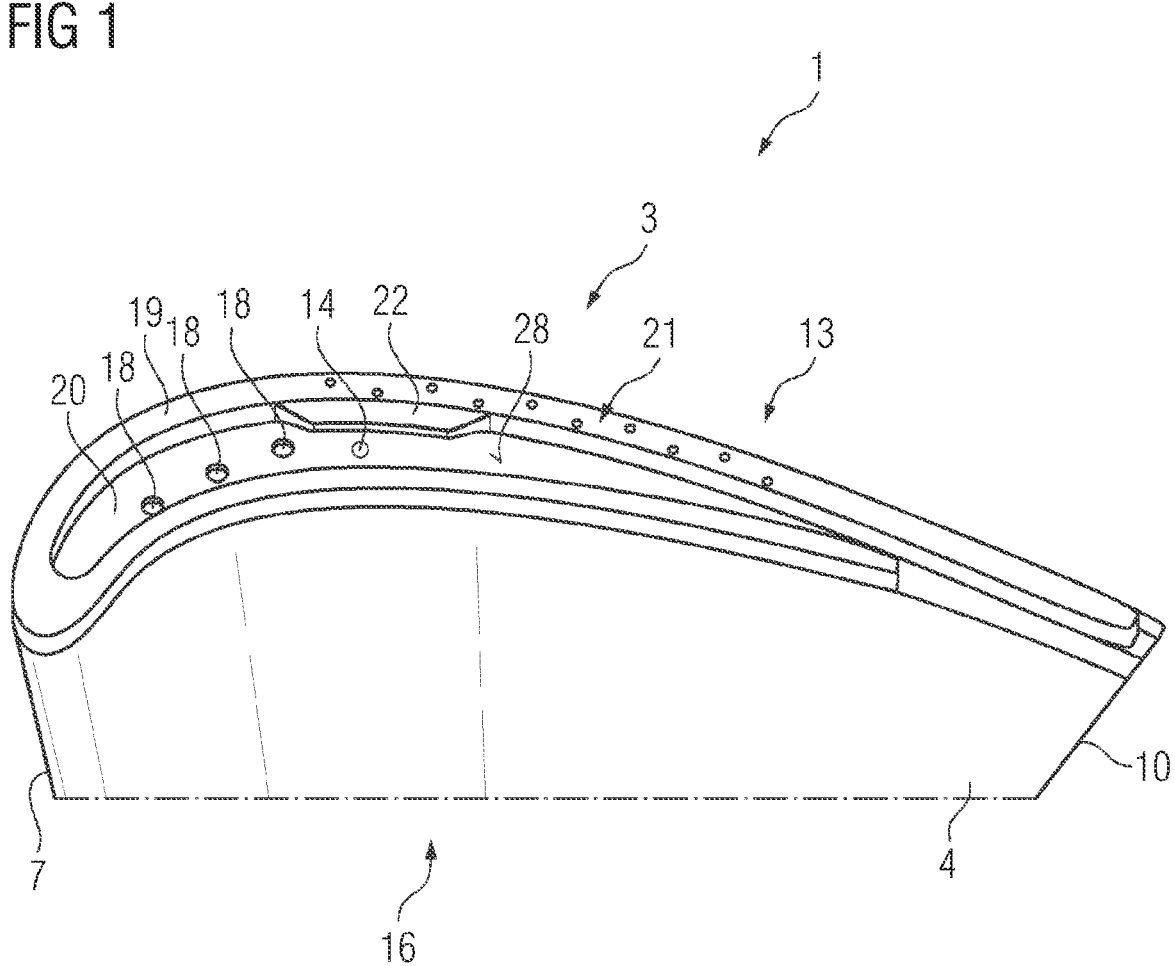

FIG. 1 shows a top view of a turbine blade tip 3 of a turbine blade 1.

A leading edge 7 and a trailing edge 10 of a blade 4 of the turbine blade 1 are shown.

The blade tip 3 has a wall 19, which extends along the outer contour of the blade 4. The wall 19 extends on a preferably flat or planar surface 28 of the turbine blade 1. As viewed in the radial direction 14 (direction of installation of the turbine blade 1 in the turbine), the wall 19 preferably has the same thickness at every point. Preferably, the wall 19 also has the same height throughout, as viewed from the surface 28. Such curves and geometries of the wall 19 are known from the prior art.

Within a recess 20 formed by the wall 19, in the main body of the turbine blade 1 there is preferably at least one, in particular at least two, cooling air holes 18, from which cooling air flows out of the surface 28. Preferably there are two or three cooling air holes 18. The cooling air holes 18 are preferably arranged close to the leading edge 7 and in the longitudinal direction (=from the leading edge 7 in the direction of the trailing edge 10) or in the direction of flow around the turbine blade 1, as viewed when in use, preferably in front of an inflow housing 22. In the case of a plurality of cooling air holes 18, these are preferably arranged in succession in the longitudinal direction of the turbine blade 1.

Figure 4:
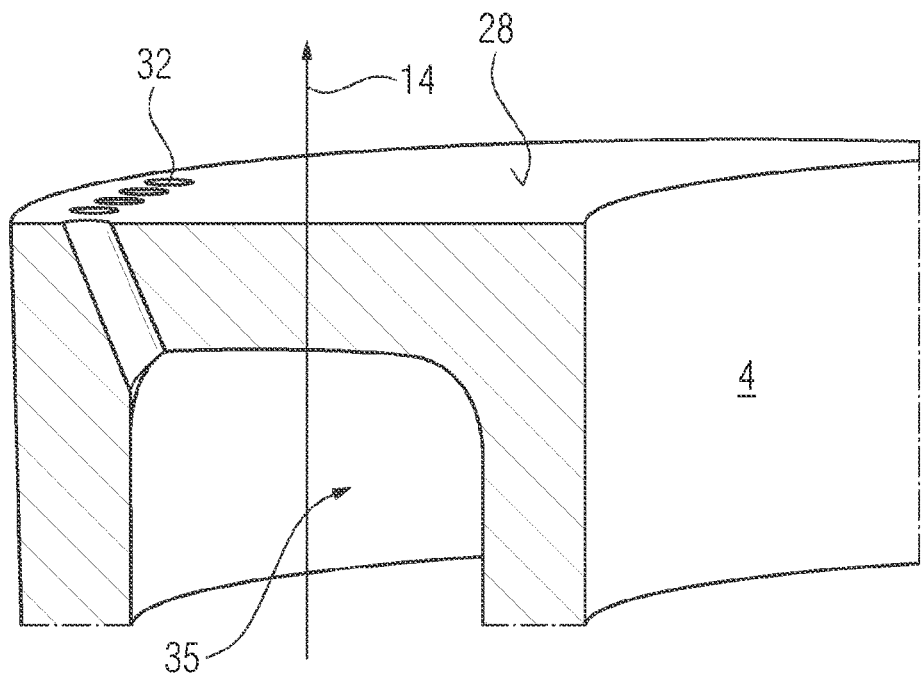
Figure 5:
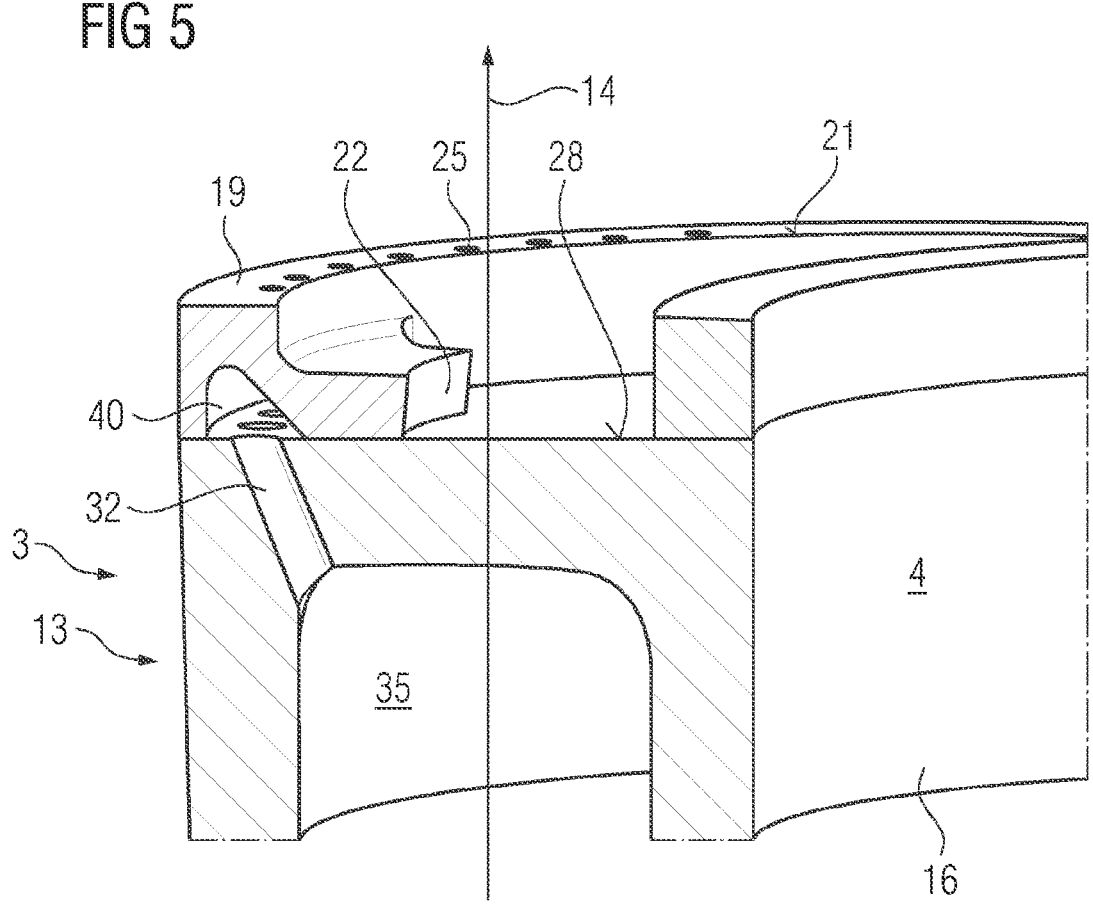

Within the recess 20, there is preferably an inflow housing 22 covering supply air channels 32 (FIGS. 4, 5) from the interior 35 of the turbine blade 1, such that cooling air can be introduced into a channel 40 in the wall 19 (FIG. 5).

In particular, there are at least three supply air channels 32. Preferably, there is also only one channel 40 in the wall 19. The inflow housing 22 is arranged on the surface 28 inside the recess 20, and directly adjoins the wall 19 directly. This inflow housing 22 is preferably realized on the suction side 13, which is opposite to the pressure side 16. The inflow housing 22 is preferably not as high as the wall 19. The inflow housing 22 is realized so as to be just long enough to cover the supply air channels 32 (FIG. 5). The inflow housing 22 is preferably located behind the last cooling air hole 18, as viewed in the longitudinal direction.

Figure 2:
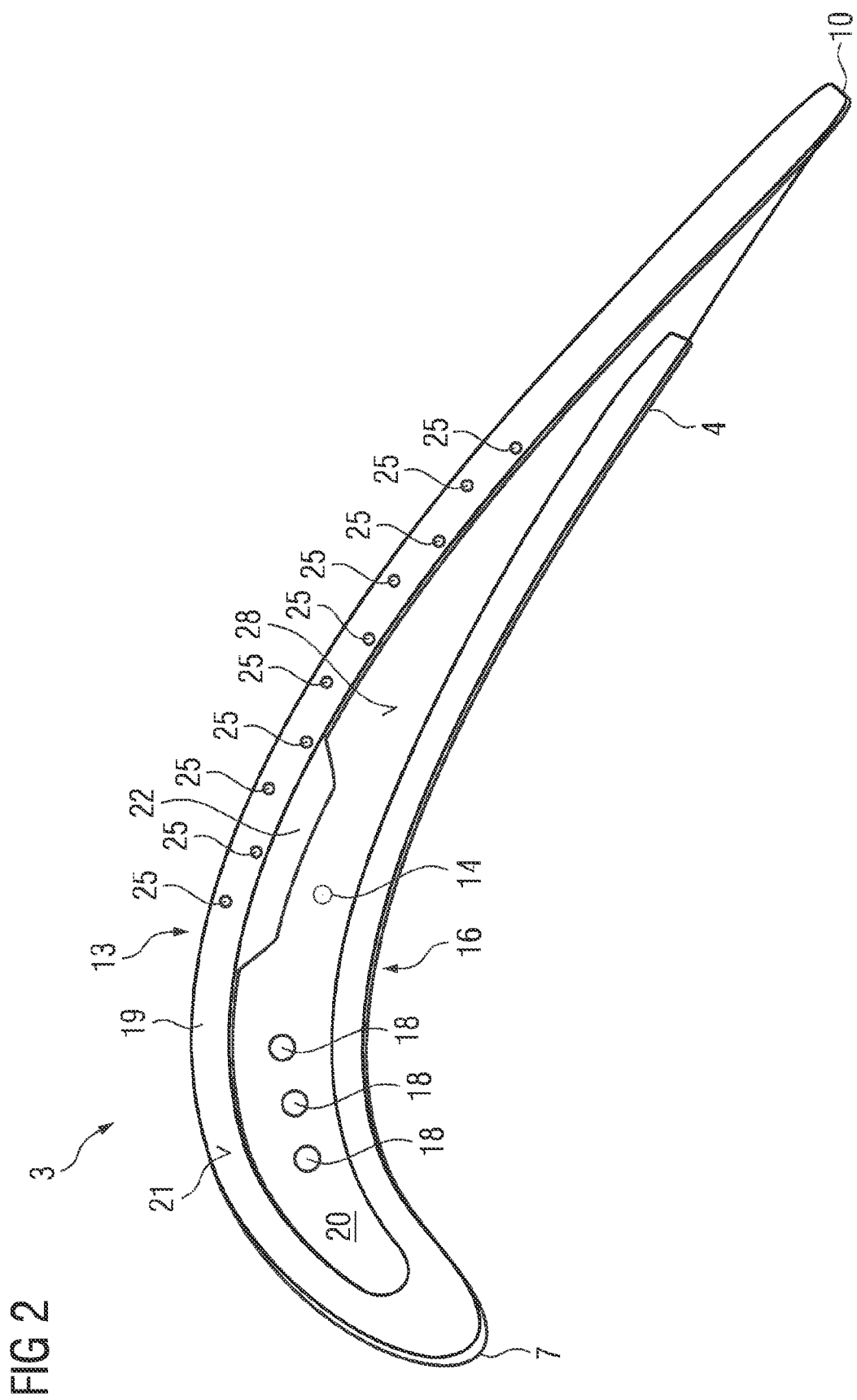

FIG. 2 shows a top view of the turbine blade tip 3. On its outermost surface 21 on the suction side 13, the wall 19 has outlets of a plurality of cooling holes 25, here in particular ten, from which cooling air flows out of the channel 40 (FIGS. 5, 6) of the wall 19, through the wall 19 to the outside. The cooling holes 25 are arranged in succession in the longitudinal direction of the turbine blade tip 3 and preferably offset from one another. There are preferably at least three of these cooling holes 25, very preferably at least five.

The cooling air supply to the cooling holes 25 is effected via a cooling air channel 40 (FIGS. 5, 6), in particular only through the one cooling air channel 40.

On the pressure side 16, there are preferably no holes realized in the wall 19.

Figure 3:
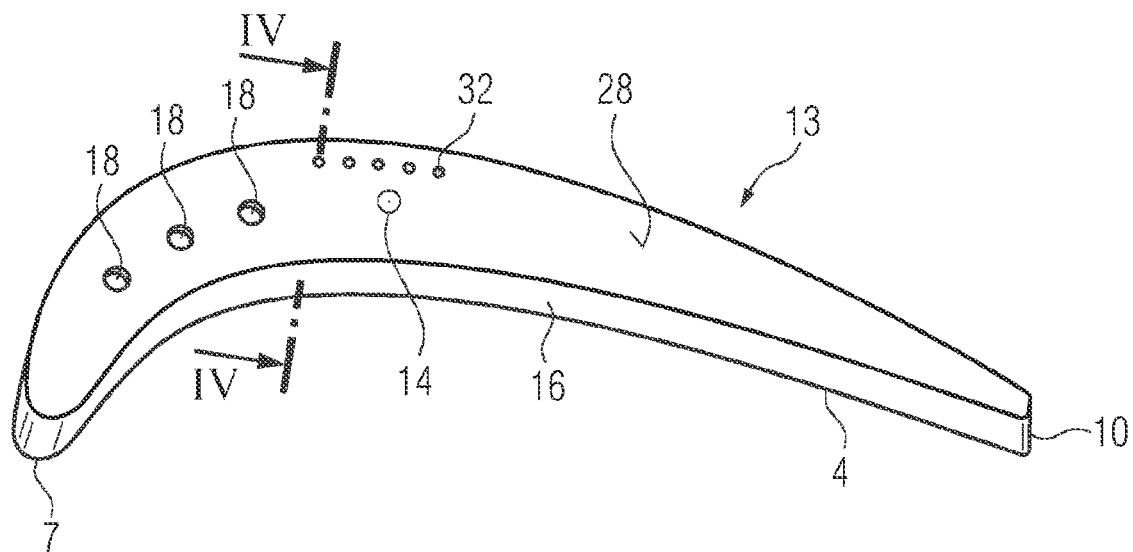

FIG. 3 shows an exemplary initial situation in the production of such a turbine blade tip 3. The turbine blade 1 is produced with a preferably flat or planar surface 28, or is provided, or reworked after use, which preferably then already has the cooling air holes 18, which are arranged within the region of the recess 20, as well as further, in particular five, supply air channels 32, from which cooling air can flow from the interior 35 (FIGS. 4, 5) of the turbine blade 1 into the channel 40 within the wall 19.

Such a turbine blade 1 may be produced at the time of production of a new blade or during the repair according to FIG. 3. The cooling air holes 18 are newly made, or are already present or are partially closed because the cooling of the blade tip 3 has been improved. In particular, the last cooling air hole 18, as viewed in the direction of circumflow.

Likewise, the entire turbine blade 1, with the blade tip 3, may be wholly produced together in an additive method.

Likewise, the blade tip 3 may be applied to the surface 28 by means of SLM, SLS, overlay welding or any other additive manufacturing method.

It is likewise possible to produce the blade tip 3 separately (FIG. 6) and connect it to the turbine blade 1 as shown in FIG. 3.

FIG. 4 shows a section according to FIG. 3 with the surface 28 and the supply air channels 32, which are supplied via the interior 35, in particular from a deflection channel (the interior 35), within the turbine blade 1. The supply air channels 32 preferably extend at an angle α of $90°>α>0°$, in particular $80°≥α≥5°$ to the radial direction 14.

Figure 6:
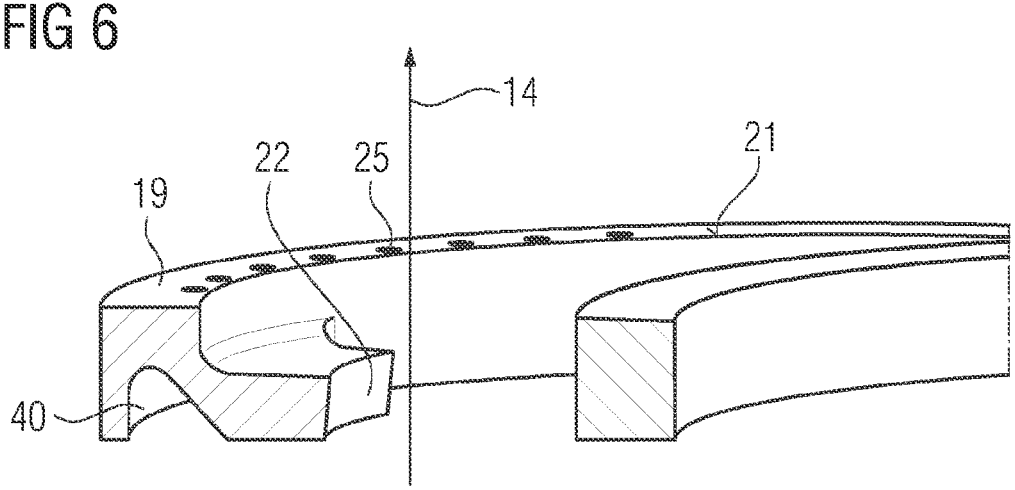

FIG. 5 shows a section through a structure of a blade tip 3 according to the invention. The blade tip 3 may include a part of the interior 35 or may be realized only from the surface 28 (FIG. 6). The suction side 13 and pressure side 16, and an interior 35 or deflection channel 35 of an internal cooling structure of the turbine blade 1 can be seen in the blade 4.

On the inside, the wall 19 in cross-section has the channel 40, into which cooling air flows from the supply air channels 32. The channel 40 then distributes the cooling air to the outside via the preferably ten cooling air holes 25.

Preferably, all of the cooling air for the wall 19 flows from preferably all of the supply air channels 32 into the preferably single channel 40, and then preferably to the outside through the wall 19, through all of the cooling holes 25.

The channel 40 has a triangle-like shape in cross-section, which is rounded at the upper end. As a result, the channel 40 has a greater width at the level of the surface 28 than at the radial end as viewed in the radial direction 14. The channel 40 is preferably realized so as to be wider at the level of the surface 28 than the diameter of the supply air channels.

The channel 40 is thus delimited in cross-section by the surface 28 of the turbine blade 1 and the wall 19, and is also formed by the inflow housing 22.

The opposite part of the wall 19 on the pressure side 16 preferably has no channel in the wall and also no cooling air holes.

Different materials may be used for the blade tip 3 and the blade 4.

Likewise, there are preferably no holes exiting on the blade side 13, 16 near the blade tip.

Such structures can be produced by additive manufacturing methods, such as, in particular, selective laser melting. This can be effected during production of a new blade or during repair.

The invention claimed is:

1. A blade tip of a turbine blade comprising:
a wall circumferential on a surface along an outer contour of the turbine blade, whereby a recess is formed within the wall between a pressure side portion of the wall and a suction side portion of the wall, wherein there is a channel in the wall, and
an inflow housing that extends into the recess from the wall,
wherein the channel is supplied with cooling air via at least one supply air channel of the turbine blade,
wherein there is a plurality of cooling air holes, which are arranged in the wall and be fluidically connected to the channel and which allow the cooling air to flow out of a radial end of the wall,
wherein the inflow housing covers the at least one supply air channel, which leads into the channel of the wall, and
wherein the inflow housing forms part of the channel.

2. The blade tip as claimed in claim 1,
wherein, within the recess there are further cooling air holes from which cooling air flows out of an interior of the turbine blade to an outside.

3. The turbine blade as claimed in claim 2,
wherein the further cooling air holes are within the recess in a region near a leading edge of the turbine blade.

4. The turbine blade as claimed in claim 2,
wherein there are two cooling air holes.

5. The blade tip as claimed in claim 1,
wherein the channel is realized in the suction side portion of the wall.

6. The blade tip as claimed in claim 1,
wherein the at least one supply air channel extends at an angle α of $90°>α>0$ to a radial direction.

7. The turbine blade as claimed in claim 6,
wherein the at least one supply air channel extends at an angle α of $80°α≥5°$ to the radial direction.

8. A turbine blade, which is either reworked or constitutes a new part, comprising:
the blade tip as claimed in claim 1.

9. The turbine blade as claimed in claim 8,
wherein the turbine blade comprises different materials for the blade tip and a remainder of the turbine blade.

10. A method for producing the blade tip as claimed in claim 1, as part of a repair or new part production, comprising:
producing the blade tip via an additive manufacturing method.

11. The method as claimed in claim 10,
wherein the blade tip further comprises further cooling air holes that open into the recess from which cooling air flows out of an interior of the turbine blade to an outside, and
wherein at least one further cooling hole of the further cooling air holes is closed.

12. The method as claimed in claim 10,
wherein the additive manufacturing method comprises selective laser melting.

13. The turbine blade as claimed in claim 1,
wherein there is only one channel.

14. The turbine blade as claimed in claim 1,
wherein there are a plurality of supply air channels.

15. The turbine blade as claimed in claim 1,
wherein there are at least three supply air channels.

16. The turbine blade as claimed in claim 1,
wherein all cooling air holes are connected to the channel.

17. The turbine blade as claimed in claim 1, wherein the wall comprises a wall radial height from the surface, and wherein the inflow housing comprises an inflow housing radial height from the surface that is less than the wall radial height.

18. The turbine blade as claimed in claim 1, wherein the inflow housing sits atop a portion of the surface that partly defines the recess.

19. The turbine blade as claimed in claim 1, wherein the pressure side portion of the wall is free of any cooling holes.

20. The turbine blade as claimed in claim 1, wherein the wall and the inflow housing are formed from a single body.

* * * * *